United States Patent
Suzuki et al.

(10) Patent No.: US 10,740,629 B2
(45) Date of Patent: Aug. 11, 2020

(54) IMAGE PROCESSING SYSTEM, IMAGE PROCESSING METHOD, INFORMATION PROCESSING DEVICE AND RECORDING MEDIUM

(71) Applicant: TOYOTA JIDOSHA KABUSHIKI KAISHA, Toyota-shi (JP)

(72) Inventors: Koichi Suzuki, Miyoshi (JP); Junichiro Igawa, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 124 days.

(21) Appl. No.: 15/983,693

(22) Filed: May 18, 2018

(65) Prior Publication Data
US 2018/0336426 A1    Nov. 22, 2018

(30) Foreign Application Priority Data

May 22, 2017    (JP) ................................. 2017-100700

(51) Int. Cl.
*G06K 9/00*    (2006.01)
*G06K 9/62*    (2006.01)
(Continued)

(52) U.S. Cl.
CPC ..... *G06K 9/00818* (2013.01); *G01C 21/3602* (2013.01); *G06K 9/00791* (2013.01);
(Continued)

(58) Field of Classification Search
CPC ........... G06K 9/00791; G06K 9/00818; G06K 9/6218; G08G 1/0133
See application file for complete search history.

(56) References Cited

U.S. PATENT DOCUMENTS

2001/0016797 A1 *  8/2001  Ogura ..................... G06T 7/246
                                                    701/301
2009/0256906 A1 * 10/2009  Ilsaka ................ G01C 21/3647
                                                    348/113
(Continued)

FOREIGN PATENT DOCUMENTS

JP         2008065529 A       3/2008

OTHER PUBLICATIONS

U.S. Appl. No. 15/891,001, filed Feb. 7, 2018.
Representation of the road network http://www.drm.jp/database/expression/.

*Primary Examiner* — John J Lee
(74) *Attorney, Agent, or Firm* — Hunton Andrews Kurth LLP

(57) ABSTRACT

An image processing system includes: a vehicle; and an information processing device, wherein the vehicle includes: an image pickup device; a first image acquiring unit configured to acquire a first image picked up by the image pickup device; and a position data sending unit configured to send position data to the information processing device, and the information processing device includes: a position data receiving unit configured to receive the position data; a second image acquiring unit configured to acquire a plurality of second images for machine learning; a grouping unit configured to divide the plurality of second images into a plurality of groups; and an analyzing unit configured to analyze a balance among the plurality of groups.

6 Claims, 14 Drawing Sheets

(51) Int. Cl.
 *G08G 1/01* (2006.01)
 *G08G 1/04* (2006.01)
 *G01C 21/36* (2006.01)
 *G06T 7/20* (2017.01)

(52) U.S. Cl.
 CPC ......... *G06K 9/6218* (2013.01); *G06K 9/6268* (2013.01); *G06T 7/20* (2013.01); *G08G 1/0112* (2013.01); *G08G 1/0133* (2013.01); *G08G 1/04* (2013.01); *G06T 2207/20081* (2013.01); *G06T 2207/20084* (2013.01); *G06T 2207/30236* (2013.01); *G06T 2207/30252* (2013.01)

(56) References Cited

U.S. PATENT DOCUMENTS

| | | | |
|---|---|---|---|
| 2015/0054978 A1* | 2/2015 | Shibagami | G02B 7/365 348/222.1 |
| 2016/0050397 A1* | 2/2016 | Di Giamberardino | H05B 37/0227 315/149 |

\* cited by examiner

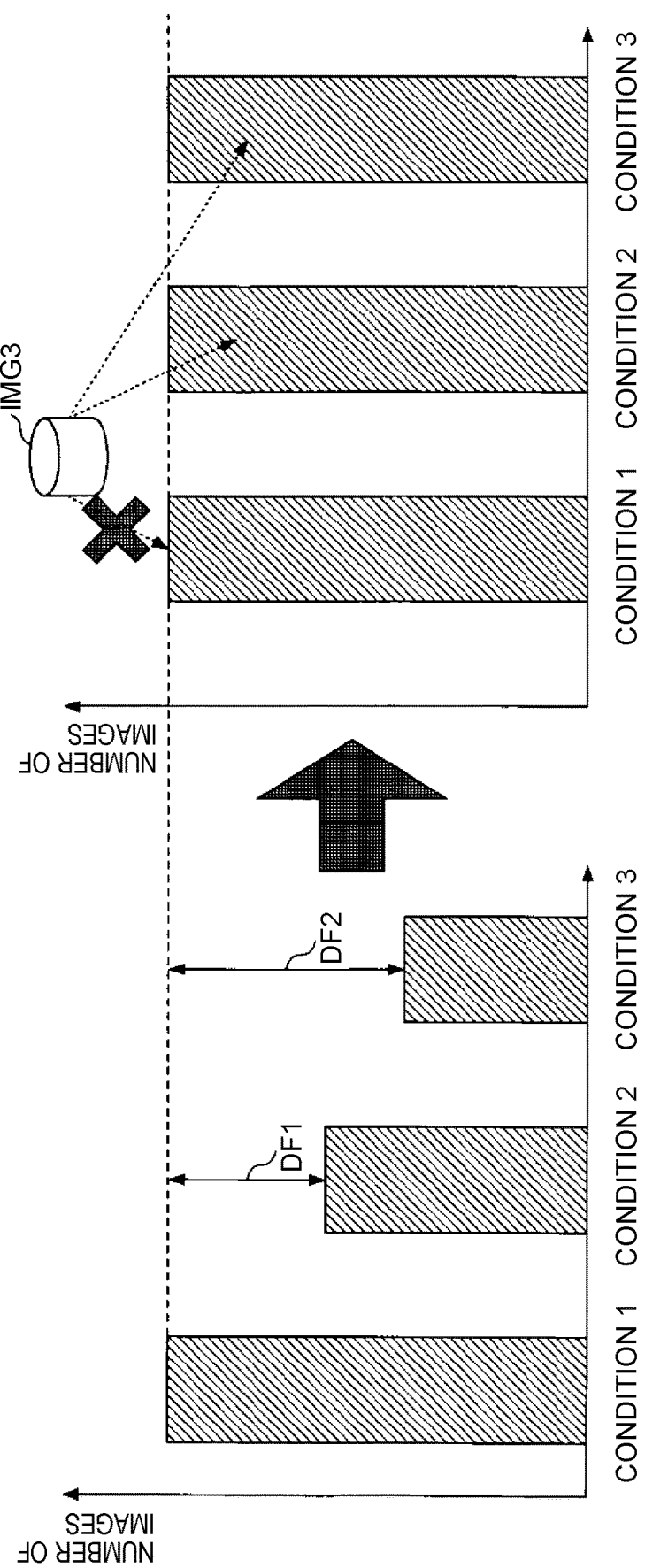

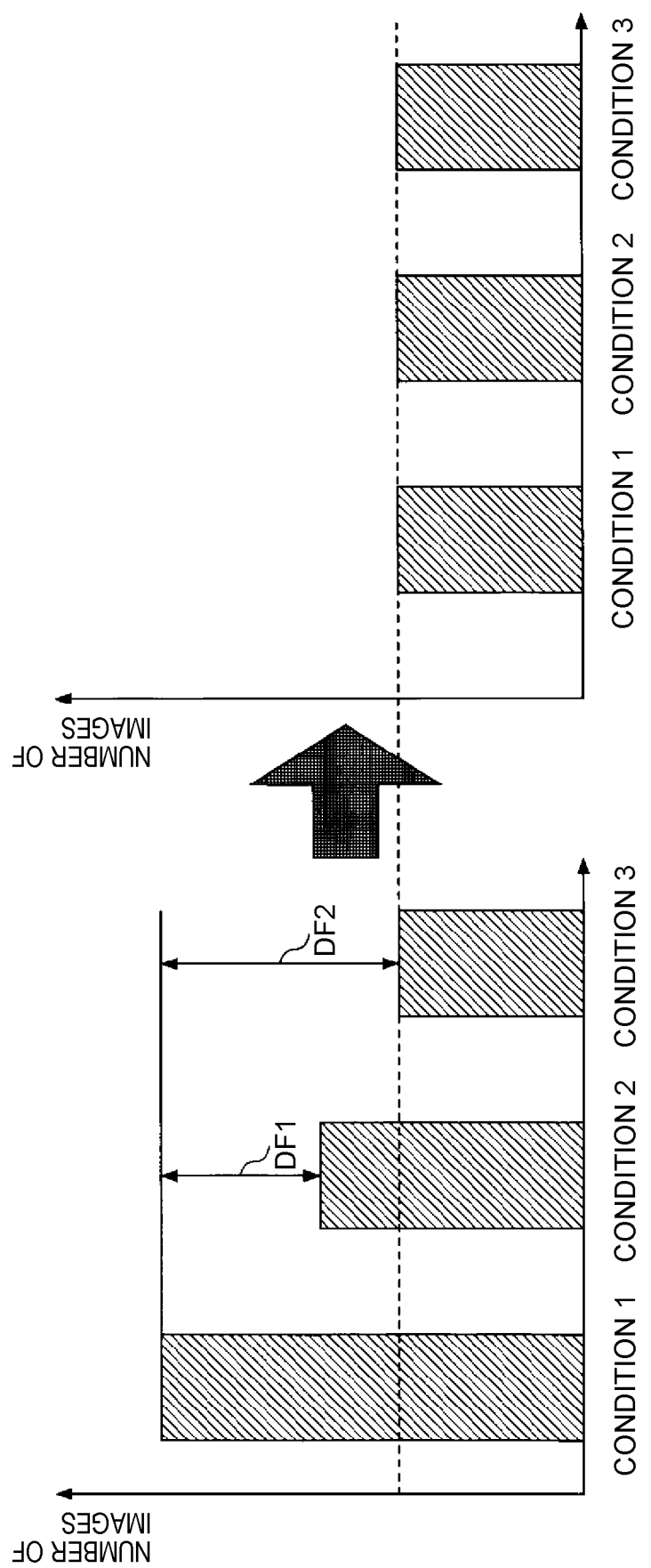

IMAGE PROCESSING SYSTEM, IMAGE PROCESSING METHOD, INFORMATION PROCESSING DEVICE AND RECORDING MEDIUM

INCORPORATION BY REFERENCE

The disclosure of Japanese Patent Application No. 2017-100700 filed on May 22, 2017 including the specification, drawings and abstract is incorporated herein by reference in its entirety.

BACKGROUND

1. Technical Field

The disclosure relates to an image processing system, an image processing method, an information processing device, and a recording medium.

2. Description of Related Art

There is a technology of investigating the cause of a congestion and the like based on a picked-up image of the periphery of a vehicle.

For example, for determining the cause of a congestion, first, a system collects picked-up images of peripheries of vehicle. Next, the system detects a vehicle that is the head of the congestion, based on the collected images. Then, the system picks up images of a head spot at which the head vehicle is positioned, from a plurality of directions, and determines the cause of the congestion based on the picked-up images. There are technologies allowing systems to detect a traffic congestion and determine the cause of the congestion in this way (for example, Japanese Patent Application Publication No. 2008-65529, and the like).

SUMMARY

However, it is likely to collect, from vehicles, data such as images picked up with similar parameters, and it is likely to produce a bias. When machine learning is performed based on the images while the balance of the data is poor in this way, the accuracy of the machine learning is likely to be influenced. However, it is not possible to grasp the balance of data such as images to be used for machine learning or the like.

Hence, image processing systems according to embodiments of the disclosure provide technologies that make it possible to grasp the balance of data such as images to be used for machine learning or the like.

An image processing system according to a first aspect of the disclosure includes: a vehicle; and an information processing device, wherein the vehicle includes: an image pickup device; a first image acquiring unit configured to acquire a first image that shows a periphery of the vehicle, the first image picked up by the image pickup device; and a position data sending unit configured to send position data to the information processing device, the position data indicating a position of the vehicle when the first image is picked up, and the information processing device includes: a position data receiving unit configured to receive the position data from the position data sending unit; a second image acquiring unit configured to acquire a plurality of second images for machine learning, the plurality of second images being relevant to the position of the vehicle based on the position data; a grouping unit configured to divide the plurality of second images into a plurality of groups based on a parameter indicating a condition at time of image pickup; and an analyzing unit configured to analyze a balance among the plurality of groups, the balance being a balance of the number of the second images that belong to the plurality of groups.

In the above aspect, the image processing system can determine the parameter of the second images, based on the position data and the second images. Then, the image processing system can group the second images and can analyze the balance of the parameter. Thereby, it is possible to know whether there is a bias in data such as images to be used for machine learning or the like that is performed in a subsequent step.

Furthermore, in the case of a poor balance, the image processing system can improve the balance, for example, by adding images for repairing the poor balance.

It is possible to grasp the balance of the data such as images to be used for machine learning or the like.

In the above aspect, the information processing device further includes: an image requesting unit configured to request a third image to the vehicle based on an analysis result by the analyzing unit, the third image being an image that is selected from the first image and by which the balance is adjusted; an image receiving unit that receives the third image from the vehicle; and a learning unit that performs learning based on the second images and the third image, and generates a learning database.

In the above aspect, the vehicle further includes: an analysis result receiving unit configured to receive an analysis result by the analyzing unit; a selecting unit configured to select a third image from the first image based on the analysis result, the third image being an image by which the balance is adjusted; and an image sending unit configured to send the third image to the information processing device, and the information processing device further includes: an image receiving unit configured to receive the third image from the vehicle; and a learning unit configured to perform learning based on the second images and the third image, and to generate a learning database.

In the above aspect, the vehicle further includes: a map data acquiring unit configured to acquire map data indicating a current position of the vehicle, a destination and a way from the current position to the destination; and a guiding unit configured to perform a guide of a route on which the vehicle travels, based on the map data and the learning database, and the guiding unit is configured to perform a guide of an intersection using a landmark.

In the above aspect, the parameter is a position at which the second image is picked up, a road on which the second image is picked up, a time at which the second image is picked up, a weather, a vehicle type of a vehicle that picks up the second image, a model of the image pickup device, control information about the vehicle that picks up the second image, a congestion condition around the position at which the second image is picked up, a crowded condition around the position at which the second image is picked up, a space condition around the position at which the second image is picked up, a vehicle speed of the vehicle that picks up the second image, a lane on which the vehicle that picks up the second image is positioned, or a combination thereof.

An image processing method according to a second aspect of the disclosure includes: a first image acquiring step in which a vehicle acquires a first image that shows a periphery of the vehicle and is picked up by an image pickup device; a position data sending step in which the vehicle sends position data to an information processing device, the position data indicating the position of the vehicle when the first image is picked up; a position data receiving step in which the information processing device receives the position data sent in the position data sending step; a second image acquiring step in which the information processing device acquires a plurality of second images for machine learning, the plurality of second images being relevant to the position of the vehicle based on the position data; a grouping step in which the information processing device divides the plurality of second images into a plurality of groups based on a parameter indicating a condition at time of image pickup; and an analyzing step in which the information processing device analyzes a balance among the plurality of groups, the balance being a balance of the number of the second images that belong to the plurality of groups.

An information processing device according to a third aspect of the disclosure includes: a position data receiving unit configured to receive position data, the position data indicating the position of a vehicle when a first image is picked up, the first image showing a periphery of the vehicle and being picked up by an image pickup device that is equipped in the vehicle; an image acquiring unit configured to acquire a plurality of second images for machine learning, the plurality of second images being relevant to the position of the vehicle based on the position data; a grouping unit configured to divide the plurality of second images into a plurality of groups based on a parameter indicating a condition at time of image pickup; and an analyzing unit configured to analyze a balance among the plurality of groups, the balance being a balance of the number of the second images that belong to the plurality of groups.

A computer-readable non-transitory recording medium according to a fourth aspect of the disclosure records a program, the program making a computer execute:

i) a position data receiving step in which the computer receives position data, the position data indicating the position of a vehicle when a first image is picked up, the first image showing a periphery of the vehicle and being picked up by an image pickup device that is equipped in the vehicle; ii) an image acquiring step in which the computer acquires a plurality of second images for machine learning, the plurality of second images being relevant to the position of the vehicle based on the position data; iii) a grouping step in which the computer divides the plurality of second images into a plurality of groups based on a parameter indicating a condition at time of image pickup; and iv) an analyzing step in which the computer analyzes a balance among the plurality of groups, the balance being a balance of the number of the second images that belong to the plurality of groups.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 13 is a diagram showing an exemplary processing result in an image processing system according to an embodiment of the disclosure; and FIG. 14 is a diagram showing a comparative example.

DETAILED DESCRIPTION OF EMBODIMENTS

Hereinafter, embodiments of the disclosure will be described with reference to the accompanying drawings.

First Embodiment

Exemplary Whole Configuration and Exemplary Hardware Configuration

Figure 1:
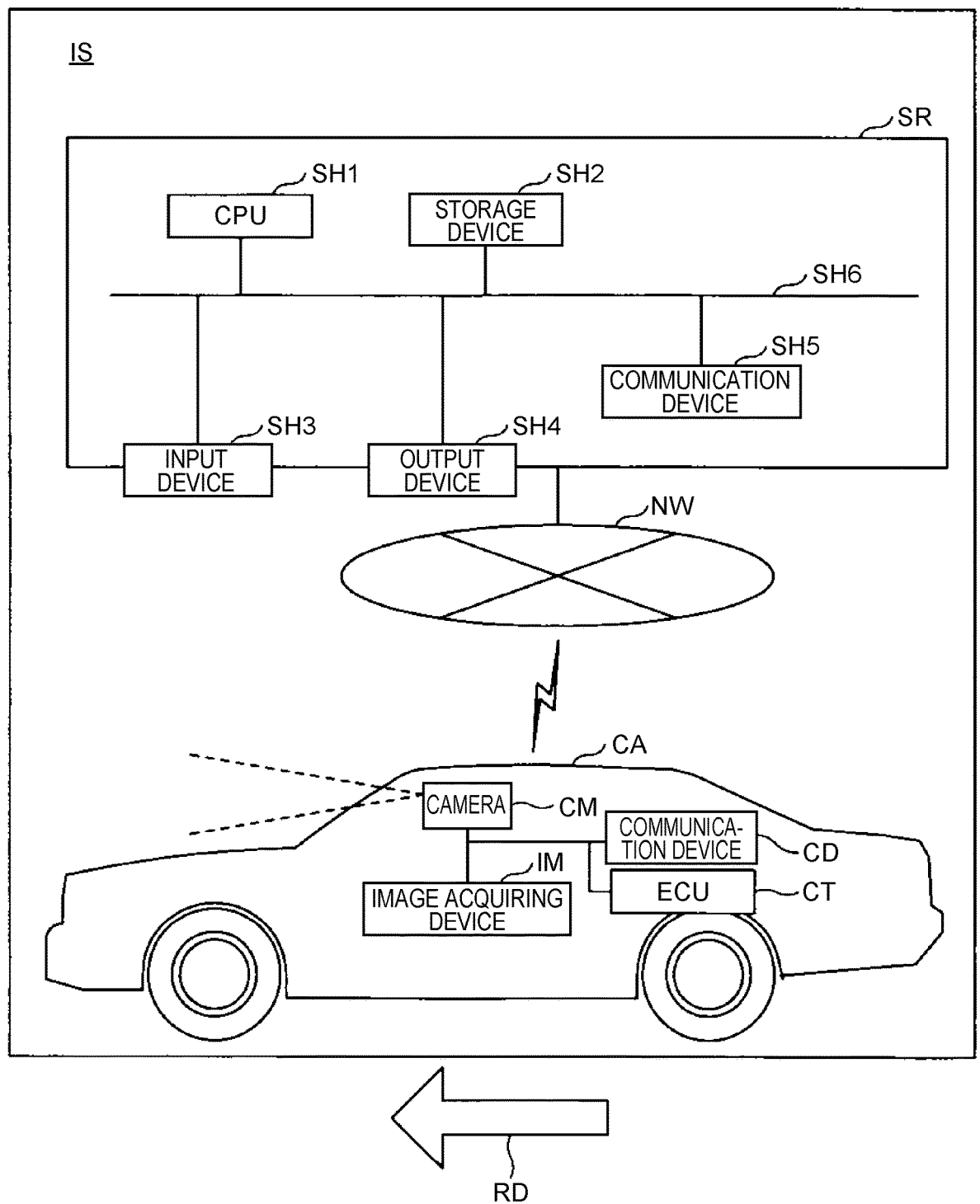
FIG. 1 is a diagram showing an exemplary whole configuration and an exemplary hardware configuration of an image processing system according to an embodiment of the disclosure.

FIG. 1 is a diagram showing an exemplary whole configuration and an exemplary hardware configuration of an image processing system according to an embodiment of the disclosure. In the illustrated example, an image processing system IS includes a camera CM that is an exemplary image pickup device, and a server SR that is an exemplary information processing device.

As illustrated, the camera CM that is an exemplary image pickup device is equipped in a vehicle CA. The camera CM shoots the periphery of the vehicle CA and generates an image. For example, as illustrated, the camera CM picks up an image of a forward sight of the vehicle CA. Next, the image generated by the camera CM is acquired by an image acquiring device IM. Furthermore, the vehicle CA is equipped with an electronic control unit (ECU) CT and a communication device CD.

For example, the image acquiring device IM includes an arithmetic device such as an electronic circuit, an electronic control unit (ECU) or a central processing unit (CPU), and a control device. The image acquiring device IM further includes an auxiliary storage device such as a hard disk, and stores the image acquired from the camera CM. Furthermore, the image acquiring device IM includes communication parts such as an antenna and a processing integrated circuit (processing IC), and sends the image to an external device such as the server SR, through a network NW.

An ECU CT is an example of the arithmetic device and the control device. The ECU CT is connected to a storage device such as a memory.

The communication device CD performs a communication for sending and receiving data with an external device, through the network NW. For example, the communication device CD includes an antenna, a processing circuit and the like.

Here, a plurality of cameras CM and a plurality of image acquiring devices IM may be provided. Further, a plurality of vehicles CA may be provided.

On the other hand, the server SR is connected to the vehicle CA, through the network. For example, the server SR includes a CPU SH1, a storage device SH2, an input device SH3, an output device SH4, and a communication device SH5.

Hardware resources included in the server SR are connected to each other through a bus SH6. The hardware resources send and receive signals and data through the bus SH6.

The CPU SH1 includes an arithmetic device and a control device. The storage device SH2 is a main storage device such as a memory. The storage device SH2 may further include an auxiliary storage device. The input device SH3 is a keyboard or the like, and inputs an operation from a user. The output device SH4 is a display or the like, and outputs a processing result or the like to the user. The communication device SH5 is a connector, an antenna or the like, and sends and receives data with an external device through the network NW, a cable or the like.

The server SR is not limited to the illustrated configuration, and for example, may further include other devices. Further, a plurality of servers SR may be provided.

Exemplary Whole Processes

Figure 2:
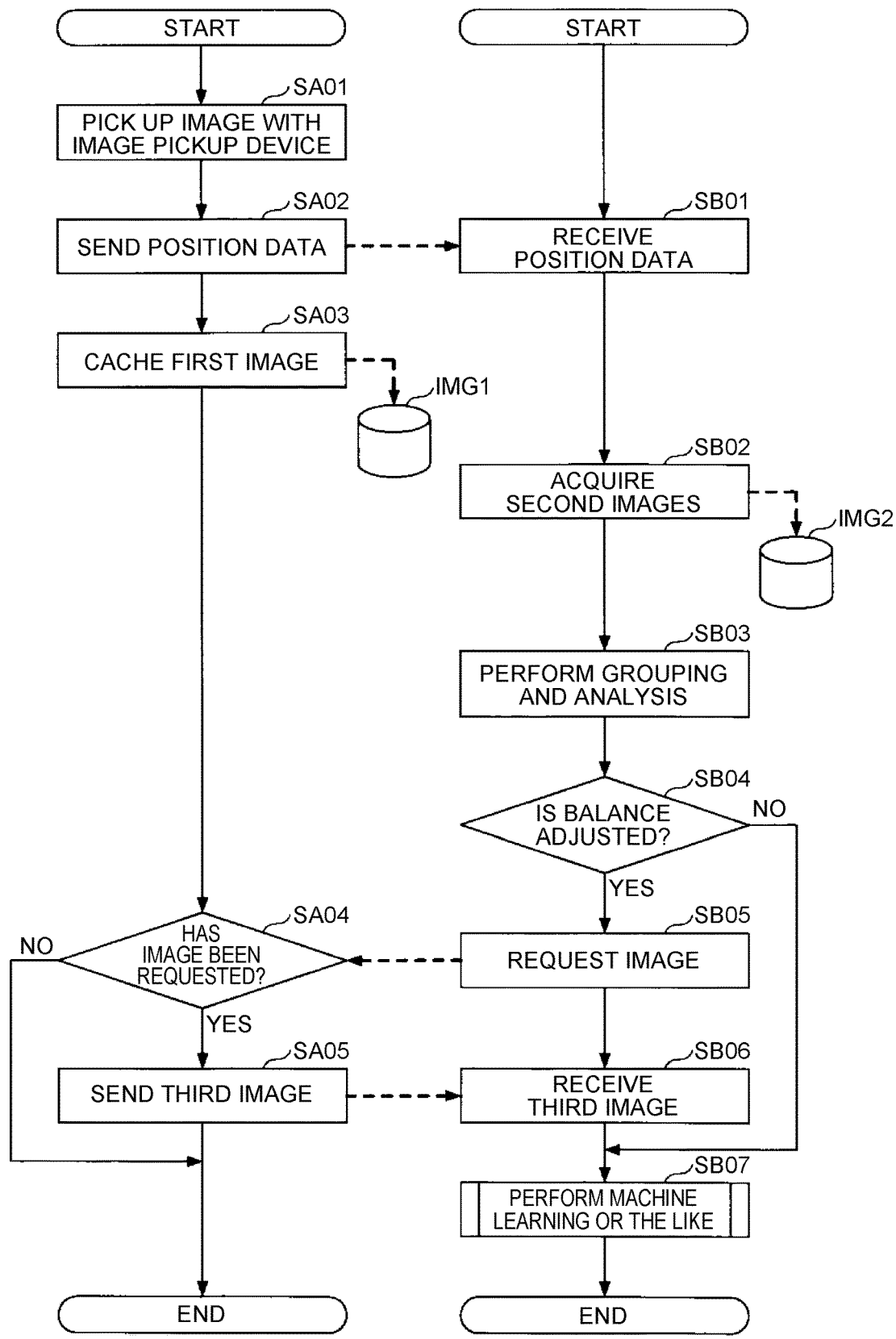
FIG. 2 is a flowchart showing an example of a whole process in an image processing system according to a first embodiment of the disclosure.

FIG. 2 is a flowchart showing an example of a whole process in an image processing system according to a first embodiment of the disclosure. In the figure, processes in the vehicle CA (see FIG. 1) are shown on the left side of FIG. 2, and on the other hand, processes in the server SR (see FIG. 1) are shown on the right side of FIG. 2.

In step SA01, the image processing system picks up an image with the image pickup device included in the vehicle CA. Hereinafter, the image picked up in step SA01 is referred to as an "image IMG1", which is an exemplary first image. For example, in the vehicle CA side, the image IMG1 is picked up with a preset period.

In step SA02, the image processing system sends position data from the vehicle CA to the server SR. For example, the position data is data of coordinates in a unit of 10 m (meters) that indicates the position of the vehicle CA, or data of a link number that indicates the position of the vehicle CA.

The link number is a number allowing identification of a road section between a node and a node on a road map. The node is a nodal point in a road network, and specifically, is an intersection or the like. That is, when it is found that the link number is found, the image processing system can identify a road on which the vehicle CA is positioned, based on previously input map data and the like. Specifically, the link number is a number described in "http://www.drm.jp/database/expression.html", for example.

The position data is text data or the like, and therefore, is smaller in data volume than image data or the like. Therefore, in the image processing system, it is possible to reduce communication volume in step SA02.

In step SB01, the image processing system receives the position data sent from the vehicle CA. That is, after step SA02, the image processing system receives the position data on the server SR side.

In step SA03, the image processing system caches the first image on the vehicle CA side. That is, the image processing system saves the image IMG1 picked up in step SA01, on the vehicle CA side. It is preferable to save the image IMG1 in association with the position data, a parameter about the image pickup of the image IMG1, and the like.

In step SB02, the image processing system acquires second images on the server SR side. The second images are images previously input, images periodically sent from the vehicle CA, combinations thereof, or the like. That is, the second images only need to be images collected from an external device and the like, and an input route and the like are not limited. Here, the second image may be partially the same as the first image. Hereinafter, an example of the second image is referred to as an "image IMG2".

In step SB03, the image processing system performs grouping of the images IMG2 and analyzes a balance, on the server SR side. First, a parameter by which the analysis is performed is previously set in the server SR.

The parameter is a condition when the images IMG2 are picked up, or the like. Specifically, the parameter is each time when the images IMG2 are picked up, each weather when the images IMG2 are picked up, or the like.

For example, the parameter is determined after image processing of the image IMG2. For example, by investigating the image IMG2 after image processing of brightness or the like, the image processing system can estimate weather, time or the like. Further, by optical flow processing of the image IMG2, the image processing system can estimate vehicle speed or the like. For the determination of the parameter, sensor data or the like may be used. For example, the vehicle speed may be determined based on data of a speed sensor. In addition, the parameter of weather may be determined by acquisition of meteorological data or the like from an external device. Similarly, the parameter of time may be determined by acquisition of time data. Further, the parameter of a position at which the image is picked up or the like may be determined from position data.

Furthermore, the parameter is each vehicle type of vehicles equipped with image pickup devices that pick up the images IMG2, each attachment position of image pickup devices that pick up the images IMG2, each model of image pickup devices that pick up the images IMG2, or the like. It is preferable to set the vehicle type, the position, the model or the like as the parameter, when image recognition processing is performed in a subsequent step.

Further, the parameter is vehicle control information of whether a headlight is set to high-beam or to low-beam at the time when the image IMG2 is picked up, or the like. It is preferable to set the control information as the parameter, when image recognition processing is performed in a subsequent step.

In addition, the parameter is data indicating a congestion condition, a crowded condition or a space condition around a position at which the image IMG2 is picked up, vehicle speed or the like. It is preferable to set the data as the parameter, when traffic information is used in a subsequent step. For example, the vehicle speed may be a vehicle speed in which the unit is 10 km/h (kilometer per hour) or the like.

Furthermore, the parameter is lane data indicating a lane on which a vehicle that picks up the image IMG2 is positioned. It is preferable to set the lane data as the parameter, when traffic information is used in a subsequent step or when image recognition processing is performed in a subsequent step.

In step SB03, first, the image processing system sets images IMG2 having an identical parameter, to one group. Then, the image processing system analyzes the balance about whether the number of images is roughly equal among groups. For example, the balance is analyzed as follows.

Figure 3:
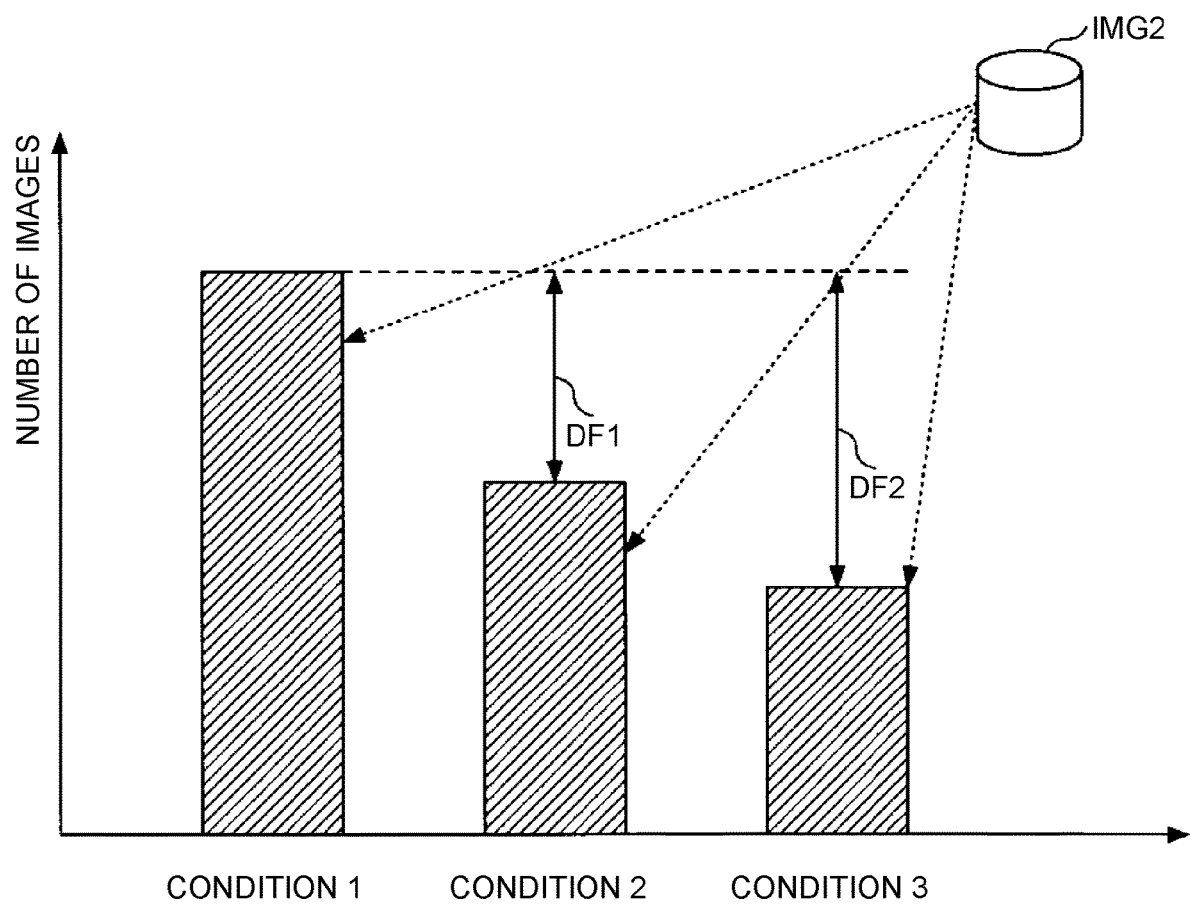
FIG. 3 is a diagram showing an exemplary balance analysis in the image processing system according to the first embodiment of the disclosure.

FIG. 3 is a diagram showing an exemplary balance analysis in the image processing system according to the first embodiment of the disclosure. For example, as illustrated, the image processing system groups the images IMG2 into three conditions: "condition 1", "condition 2" and "condition 3". Specifically, suppose that the parameter is "weather". Further, suppose that the "condition 1" is a group "fair", the "condition 2" is a group "cloudy", and the "condition 3" is a group "rainy". In the figure, the abscissa axis indicates the condition, and the ordinate axis indicates the number of images. In this example, the images IMG2 include many images that belong to the group of the "condition 1". Specifically, the most collected images are images that were picked up on "fair" day, and the second most collected images are images that were picked up on "cloudy" day. In the example, the least collected images are images that were picked up on "rainy" day. In the following, the case of the illustrated balance will be described as an example.

In this example, there is a bias to the "condition 1", and the image processing system outputs an analysis result of a poor balance. Specifically, on the basis of the "condition 1", the number of the images of the "condition 2" is less than the number of the images of the "condition 1", by a difference DF1. Furthermore, on the basis of the "condition 1", the number of the images of the "condition 3" is less than the number of the images of the "condition 1", by a difference DF2. On the other hand, when there is no difference or when the difference is equal to or less than a predetermined value, the image processing system outputs an analysis result of a good balance. In the case of the analysis result of a poor balance, the image processing system determines adjustment of the balance.

In step SB04, the image processing system determines whether to adjust the balance, on the server SR side. That is, the image processing system determines whether to adjust the balance, based on the analysis result in step SB03.

Next, when the image processing system determines that the image processing system adjusts the balance (YES in step SB04), the image processing system proceeds to step SB05. On the other hand, when the image processing system determines that the image processing system does not adjust the balance (NO in step SB04), the image processing system proceeds to step SB07.

In step SB05, the image processing system requests an image from the server SR side to the vehicle side. That is, in the case of the example shown in FIG. 3, in step SB05, the image processing system adjusts the balance such that the difference DF1 and the difference DF2 are reduced. Specifically, in the case of the example shown in FIG. 3, the image processing system requests images satisfying the "condition 2", to the vehicle CA, for reducing the difference DF1. Similarly, the image processing system requests images satisfying the "condition 3", to the vehicle CA, for reducing the difference DF2.

In step SA04, the image processing system determines whether the image has been requested. That is, when step SB05 is performed, the image processing system determines that the image has been requested.

Next, when the image processing system determines that the image has been requested (YES in step SA04), the image processing system proceeds to step SA05. On the other hand, when the image processing system determines that the image has not been requested (NO in step SA04), the image processing system ends the process.

In step SA05, the image processing system selects the requested image from first images (hereinafter, an image selected from first images is referred to as a "third image") and sends the selected image. That is, in the case of the example shown in FIG. 3, the image processing system selects images satisfying the "condition 2" and images satisfying the "condition 3" from the images IMG1, and sends the selected images from the vehicle CA to the server SR, as the third image.

In step SB06, the image processing system receives the third image. That is, the image processing system receives the image IMG1 sent in step SA05, on the server SR side.

In step SA04, step SA05, step SB05 and step SB06, by a so-called push communication, the image processing system adjusts the balance by adding the third image allowing the difference to be compensated.

In step SB07, the image processing system performs machine learning or the like. For example, suppose a case where navigation is performed as follows.

Figure 4:
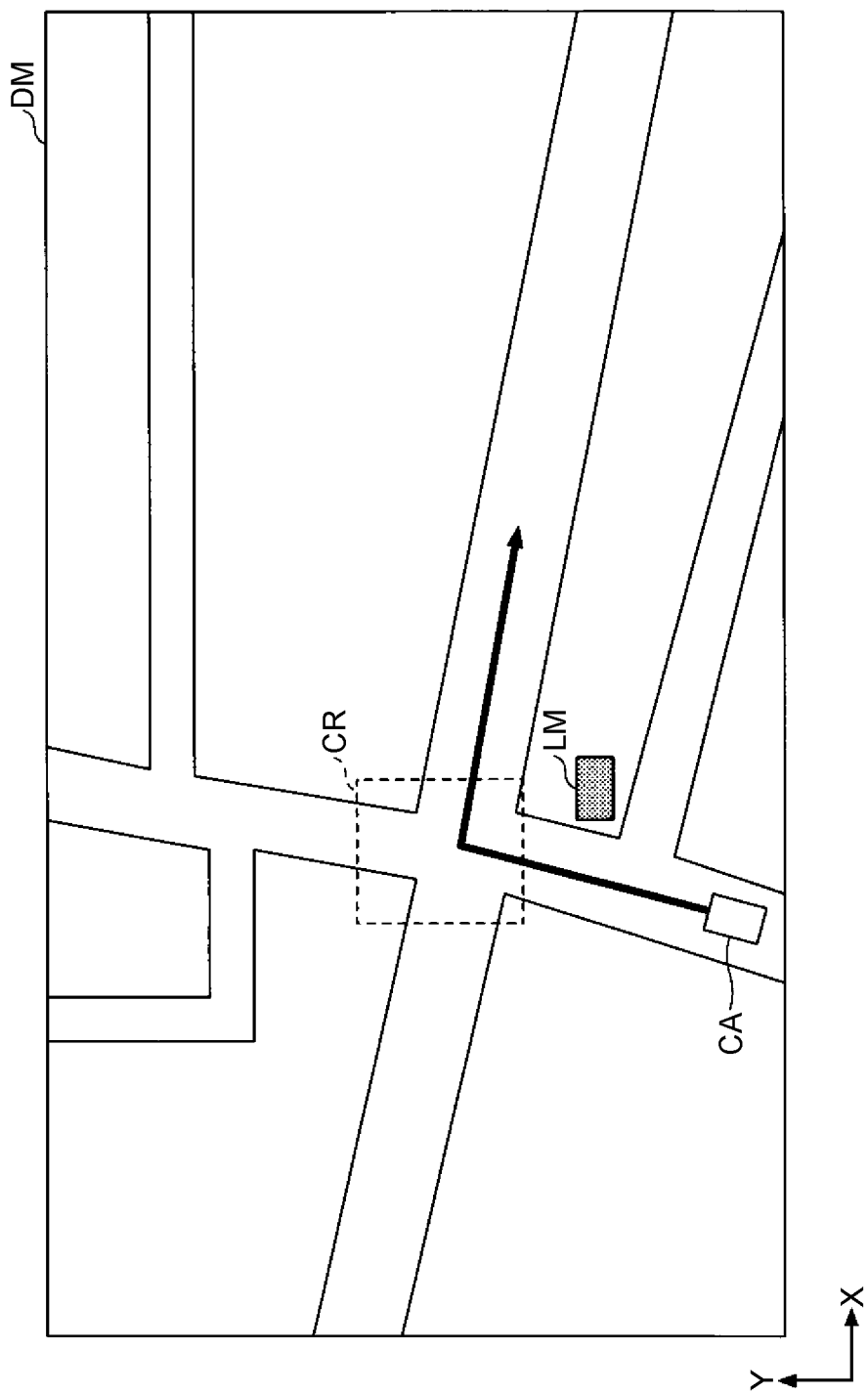
FIG. 4 is a diagram showing an exemplary navigation in a vehicle.

FIG. 4 is a diagram showing an exemplary navigation in the vehicle.

For example, suppose that the vehicle CA travels to a destination as illustrated. As illustrated, the vehicle CA travels on a route along which the vehicle CA turns right at an intersection CR in front of the vehicle CA (a route shown by the arrow in the figure), as a route to the destination. That is, in this situation, in the case where a so-called car navigation device is equipped in the vehicle CA, the car navigation device guides a driver who operates the vehicle CA, through a voice, an image, a combination thereof or the like, such that the vehicle CA turns right at the intersection CR.

Further, for example, when the vehicle CA receives map data DM from an external device or acquires the map data DM by an input from a recording medium, the vehicle CA can grasp the position of the vehicle CA, the position of the intersection CR, the fact that the destination is in the rightward direction from the intersection CR, and the like.

In the following, the illustrated situation will be described as an example. The situation where the image processing system is used is not limited to the illustrated situation, and for example, the image processing system may be used in situations other than intersections.

Further, suppose that it is desirable for the car navigation device to perform the guide of the route using a signboard LM placed near the intersection CR as a landmark, as illustrated. In such a case, in the vehicle CA, an image of a forward sight of the vehicle CA is picked up by the image pickup device, and image recognition of the signboard LM on the picked-up image is performed. For such an image recognition, for example, it is desirable to perform machine learning based on the image containing the signboard LM, as follows.

Figure 5:
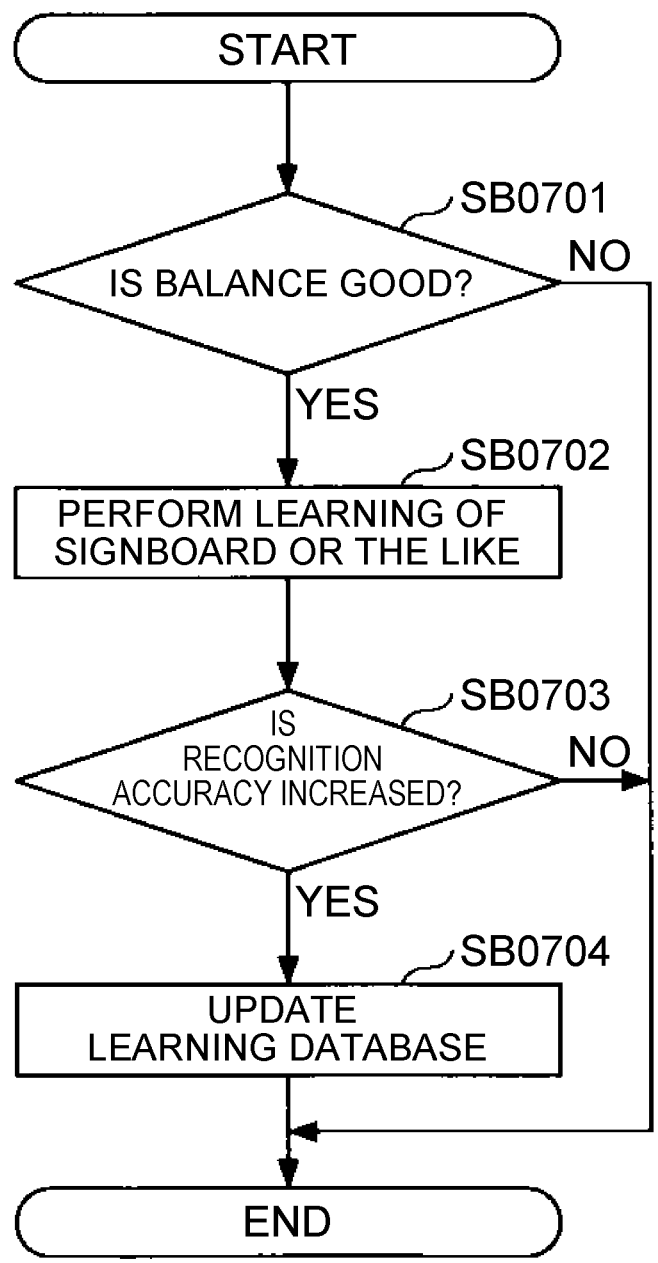
FIG. 5 is a flowchart showing an exemplary process for machine learning or the like in the image processing system according to the first embodiment of the disclosure.

FIG. 5 is a flowchart showing an exemplary process for machine learning or the like in the image processing system according to the first embodiment of the disclosure. In step SB07 shown in FIG. 2, the process shown in FIG. 5 is performed, for example.

In step SB0701, the image processing system determines whether the balance of images to be used for the machine learning is good. That is, when the balance is adjusted in step SA04, step SA05, step SB05, step SB06 and the like shown in FIG. 2, the bias as shown in FIG. 3 is small, and the images to be used for the machine learning are often well balanced. In such a case, the image processing system determines that the balance of the images to be used for the machine learning is good.

Next, when the image processing system determines that the balance of the images to be used for the machine learning is good (YES in step SB0701), the image processing system proceeds to step SB0702. On the other hand, when the image processing system determines that the balance of the images to be used for the machine learning is not good (NO in step SB0701), the image processing system ends the process shown in FIG. 5.

In step SB0702, the image processing system performs learning of signboards, or the like. Specifically, in the case of using the signboard LM for the guide as shown in FIG. 4, the image processing system performs the learning using the image containing the signboard LM. Thereby, the image processing system can perform the image recognition of the signboard LM on the image.

In step SB0703, the image processing system determines whether recognition accuracy is increased. In this example, the image processing system determines whether the recognition accuracy for the image recognition of the signboard LM on the image is increased. That is, the image processing system determines whether the recognition accuracy is increased, based on whether the recognition accuracy, due to the learning in step SB0702, is increased compared to the recognition accuracy before the learning.

Next, when the image processing system determines that the recognition accuracy is increased (YES in step SB0703), the image processing system proceeds to step SB0704. On the other hand, when the image processing system determines that the recognition accuracy is not increased (NO in step SB0703), the image processing system ends the process shown in FIG. 5.

In step SB0704, the image processing system updates a learning database. That is, the image processing system uses the updated learning database in the subsequent car navigation and the like. The learning database may be configured to be used by an external device other than the image processing system.

Second Embodiment

The balance may be adjusted on the vehicle CA side by a so-called local management, instead of the adjustment of the balance by the push communication in the first embodiment.

In the following, a case where the whole configuration and the hardware configuration are the same as those in the first embodiment will be described as an example. Therefore, repetitive descriptions will be omitted. Different points will be mainly described below. A second embodiment is different in whole process from the first embodiment.

Figure 6:
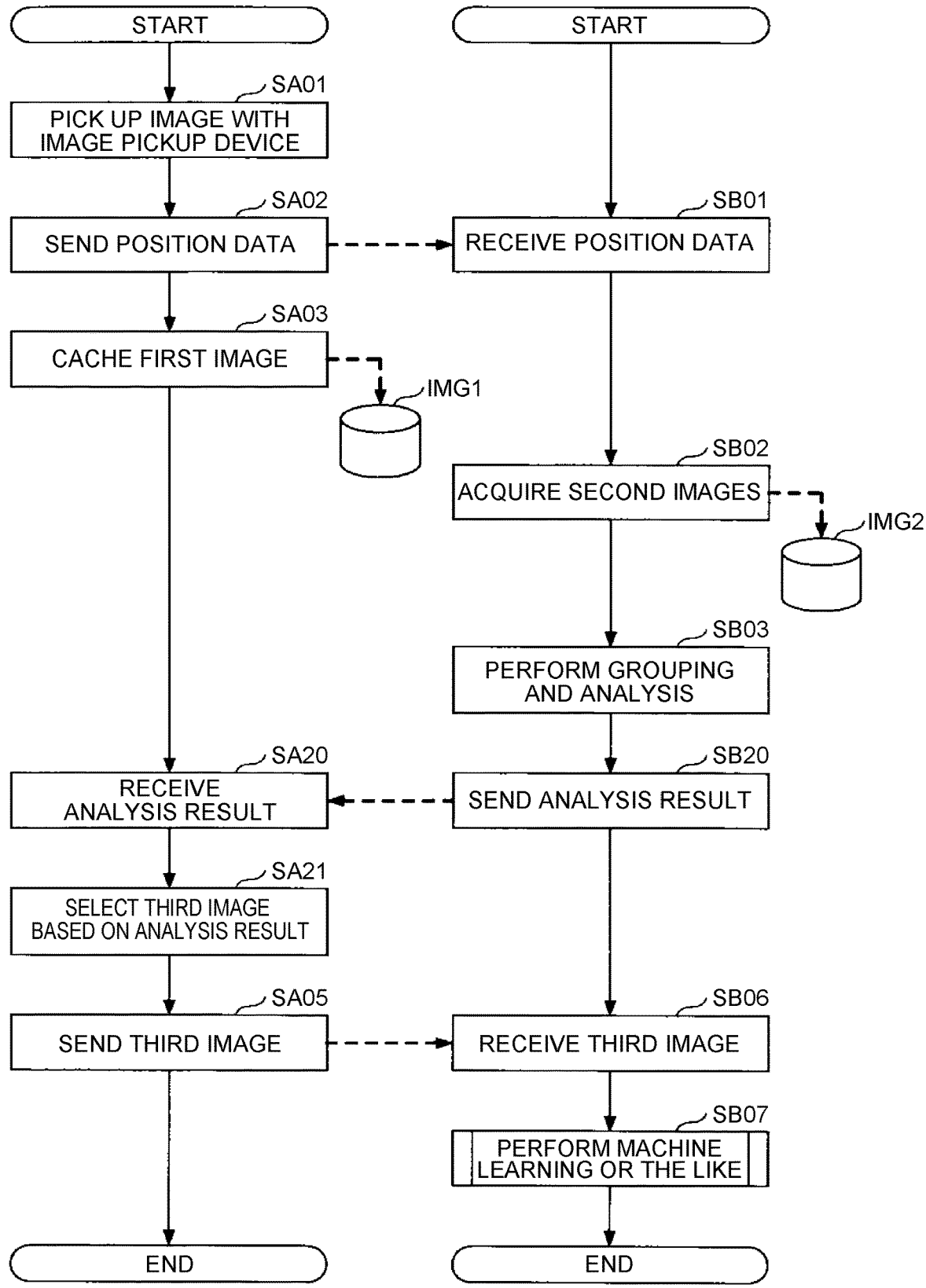
FIG. 6 is a flowchart showing an example of a whole process in an image processing system according to a second embodiment of the disclosure.

FIG. 6 is a flowchart showing an example of the whole process in an image processing system according to the second embodiment of the disclosure. In the figure, identical reference characters are assigned to identical process to those in the first embodiment, and the descriptions will be omitted.

In step SB20, the image processing system sends the analysis result from the server SR to the vehicle CA. That is, the image processing system sends the data indicating the balance of the images analyzed in step SB03, to the local side.

In step SA20, the image processing system receives the analysis result on the vehicle CA side. That is, the image processing system receives the data indicating the analysis result sent in step SB20, on the vehicle CA side. Thereby, the vehicle CA can know that the images on the server SR side are in the state shown in FIG. 3, for example. Accordingly, based on the analysis result, the vehicle CA can know the parameter of images that should be sent to the server SR for improving the balance.

In step SA21, the image processing system selects the third image from the first images based on the analysis result, on the vehicle CA side. Specifically, in the case of the example shown in FIG. 3, the image processing system, on the vehicle CA side, selects third images satisfying the "condition 2" and third images satisfying the "condition 3" from the images IMG1, and sends the selected images in step SA05.

Accordingly, when the selected image is sent to the server SR in step SA21, the image processing system can adjust the balance of the images IMG2 with the images sent in step SA05.

Third Embodiment

The vehicle CA may be configured to select the third image as follows.

In the following, a case where the car navigation uses an object such as the signboard LM on a road for guide as shown in FIG. 4 will be described as an example. That is, it is desirable for the vehicle CA to send an image containing the signboard LM, to the server SR. For example, the third image may be selected by the following process.

Figure 7:
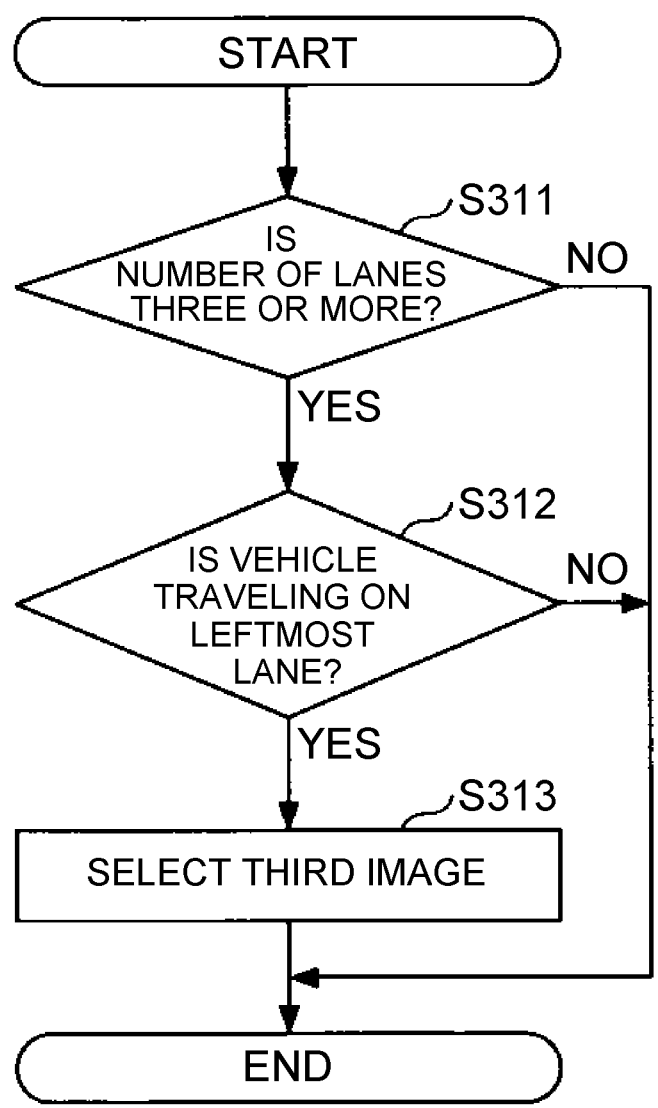
FIG. 7 is a flowchart showing an example of selection of a third image in an image processing system according to a third embodiment of the disclosure.

FIG. 7 is a flowchart showing an example of selection of the third image in the image processing system according to a third embodiment of the disclosure. For example, the process shown in FIG. 7 is performed at a timing after the first image is cached and before the third image is sent to the server SR, on the vehicle CA side.

In the following description, it is assumed that the image processing system is set so as to collect images containing objects that appear on the left side of a road on which the vehicle CA travels. The setting is not limited to the left side, and another setting such as a setting to the right side may be adopted.

In step S311, the image processing system determines whether a roadway on which the vehicle CA is traveling has three or more lanes. For example, the image processing system can calculate the number of the lanes of the roadway on which the vehicle CA is traveling, by performing, for example, an image processing of the image IMG1 for detecting white lines and counting white lines existing in the direction orthogonal to a traveling direction RD.

Next, when the image processing system determines that the roadway on which the vehicle CA is traveling has three or more lanes (YES in step S311), the image processing system proceeds to step S312. On the other hand, when the image processing system determines that the roadway on which the vehicle CA is traveling does not have three or more lanes (NO in step S311), the image processing system ends the process.

In step S312, the image processing system determines whether the vehicle CA is traveling on the leftmost lane. For example, by the image processing of the image IMG1, the position of the vehicle CA or the like, the image processing system can know whether the vehicle CA is on the leftmost lane.

Next, when the image processing system determines that the vehicle CA is traveling on the leftmost lane (YES in step S312), the image processing system proceeds to step S313. On the other hand, when the image processing system determines that the vehicle CA is not traveling on the leftmost lane (NO in step S312), the image processing system ends the process.

In step S313, the image processing system selects an image IMG1 picked up under the current traveling condition, as a candidate of the third image.

For example, a case where the vehicle CA travels on the following roadway will be described as an example.

Figure 8:
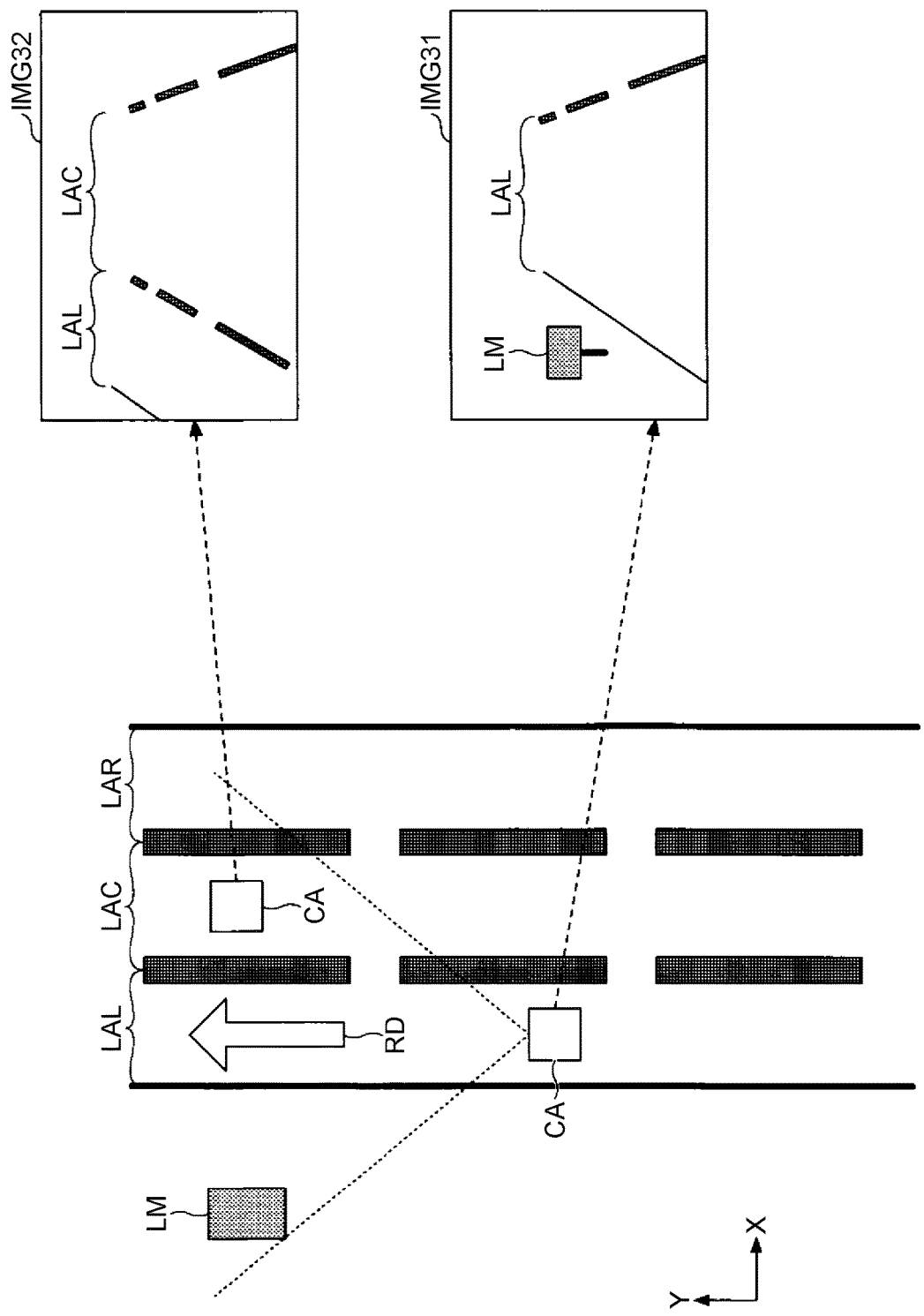
FIG. 8 is a diagram showing an exemplary roadway on which a vehicle travels and exemplary images in an embodiment of the disclosure.

FIG. 8 is a diagram showing an exemplary roadway on which the vehicle travels and exemplary images in an embodiment of the disclosure. Suppose that the vehicle CA is traveling in the traveling direction RD (in the figure, in the direction from the lower side to the upper side) as illustrated. In this example, the roadway has a left lane LAL, a central lane LAC, and a right lane LAR. Accordingly, when the vehicle CA is traveling on this roadway, the image processing system determines in step S311 that the roadway on which the vehicle CA is traveling has three or more lanes (YES in step S311).

Further, when the vehicle CA is traveling on the left lane LAL, the image processing system determines in step S312 that the vehicle CA is traveling on the leftmost lane (YES in step S312).

In the case where the vehicle CA is traveling on a roadway having three or more lanes as illustrated, only images picked up while the vehicle CA is traveling on the left lane LAL contain an object such as the signboard LM that appears on the left side of the roadway on which the vehicle CA is traveling. Specifically, for example, an image IMG31 is obtained as an image picked up while the vehicle CA is traveling on the left lane LAL. Further, for example, an image IMG32 is obtained as an image picked up while the vehicle CA is traveling on the central lane LAC.

In many cases, the signboard LM is in the angular field of the image pickup device on the left lane LAL, but the signboard LM is not in the angular field of the image pickup device on the central lane LAC or the right lane LAR. Therefore, in many cases, the image IMG31 contains the signboard LM and the image IMG32 does not contain the signboard LM, as illustrated. Accordingly, the image processing system selects images picked up while the vehicle CA is traveling on the left lane LAL, as exemplified by the image IMG31, as candidates of the third image (step S313). Meanwhile, since images such as the image IMG32 are not selected as the third image, the images such as the image IMG32 are not sent to the server SR. Therefore, the image processing system can reduce communication volume.

That is, the image processing system can reduce communication volume, by narrowing down the third image to images picked up when the vehicle CA is at a position allowing the image pickup of an object intended for image recognition by machine learning, as exemplified by the image IMG31.

Instead of the process shown in FIG. 7, the following process may be adopted, for example.

Figure 9:
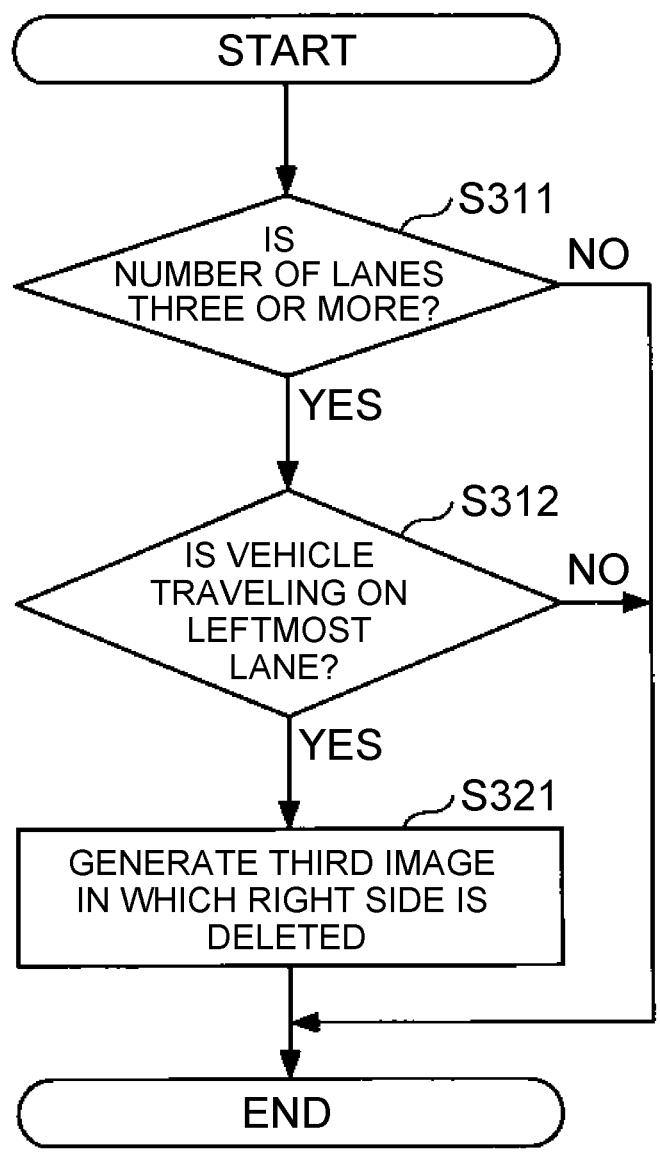
FIG. 9 is a flowchart showing a modification of the selection of the third image in the image processing system according to the third embodiment of the disclosure.

FIG. 9 is a flowchart showing a modification of the selection of the third image in the image processing system according to the third embodiment of the disclosure. The process shown in FIG. 9 is different from the process shown in FIG. 7, in that step S321 is adopted instead of step S313. The different point will be mainly described below. Identical reference characters are assigned to identical processes, and the description will be omitted.

In step S313, the image processing system deletes the right side of the image IMG1, and selects an image after the deletion, as a candidate of the third image. Specifically, in step S313, the image processing system generates an image as follows.

Figure 10:
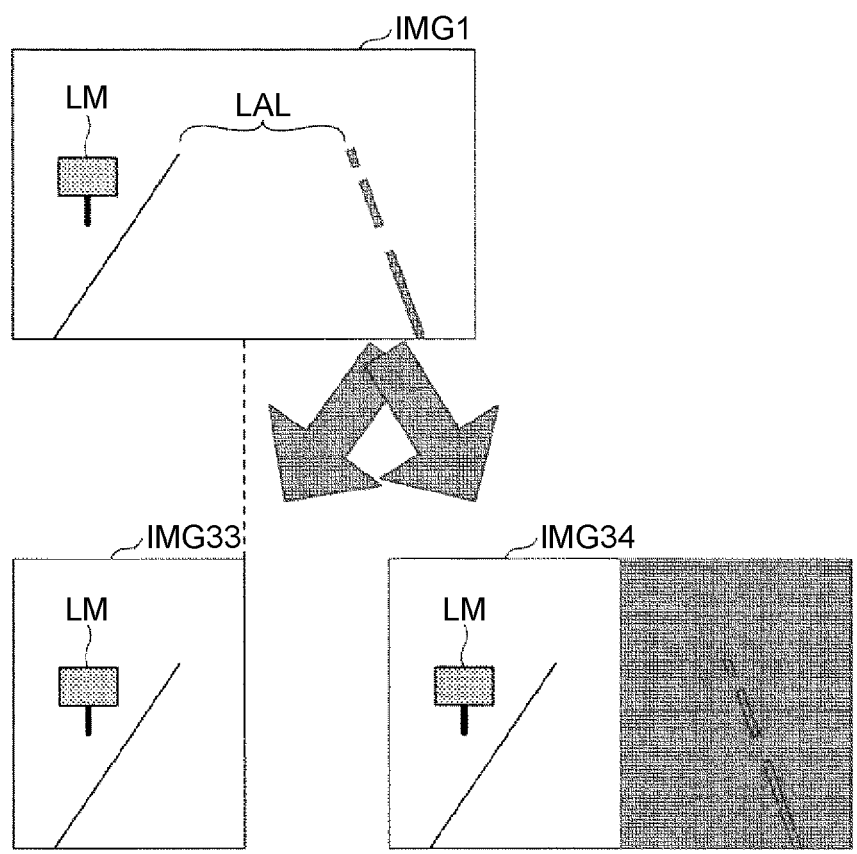
FIG. 10 is a diagram showing an example of generation of an image that is a candidate of the third image in the image processing system according to the third embodiment of the disclosure.

FIG. 10 is a diagram showing an example of generation of an image that is a candidate of the third image in the image processing system according to the third embodiment of the disclosure. For example, suppose that an illustrated image IMG1 is picked up as the first image and is cached. In step S313, the image processing system processes the image IMG1, to generate an image IMG33 or an image IMG34.

Specifically, the image IMG33 is an image in which the right side of the image IMG1 is deleted as illustrated. Thereby, the image IMG33 is smaller in data volume than the image IMG1.

Further, the image IMG34 is an image in which the right side of the image IMG1 is filled. In this case, it is determined that data of the right side does not need to be sent, and therefore, the image IMG34 is an image that can be sent with a smaller communication volume than the image IMG1.

In the machine learning or the like (step SB07), images containing an object that is a target of the learning are used. Therefore, in the images, data of the range other than a range in which the object such as the signboard LM appears is often unnecessary for the machine learning or the like. Hence, as illustrated, the image processing system processes the image IMG1, to delete the range that is not used for the machine learning or the like from the image IMG1 or to prohibit the range that is not used for the machine learning or the like from being sent to the server SR. Thereby, the image processing system can reduce communication volume.

Exemplary Functional Configurations

Figure 11:
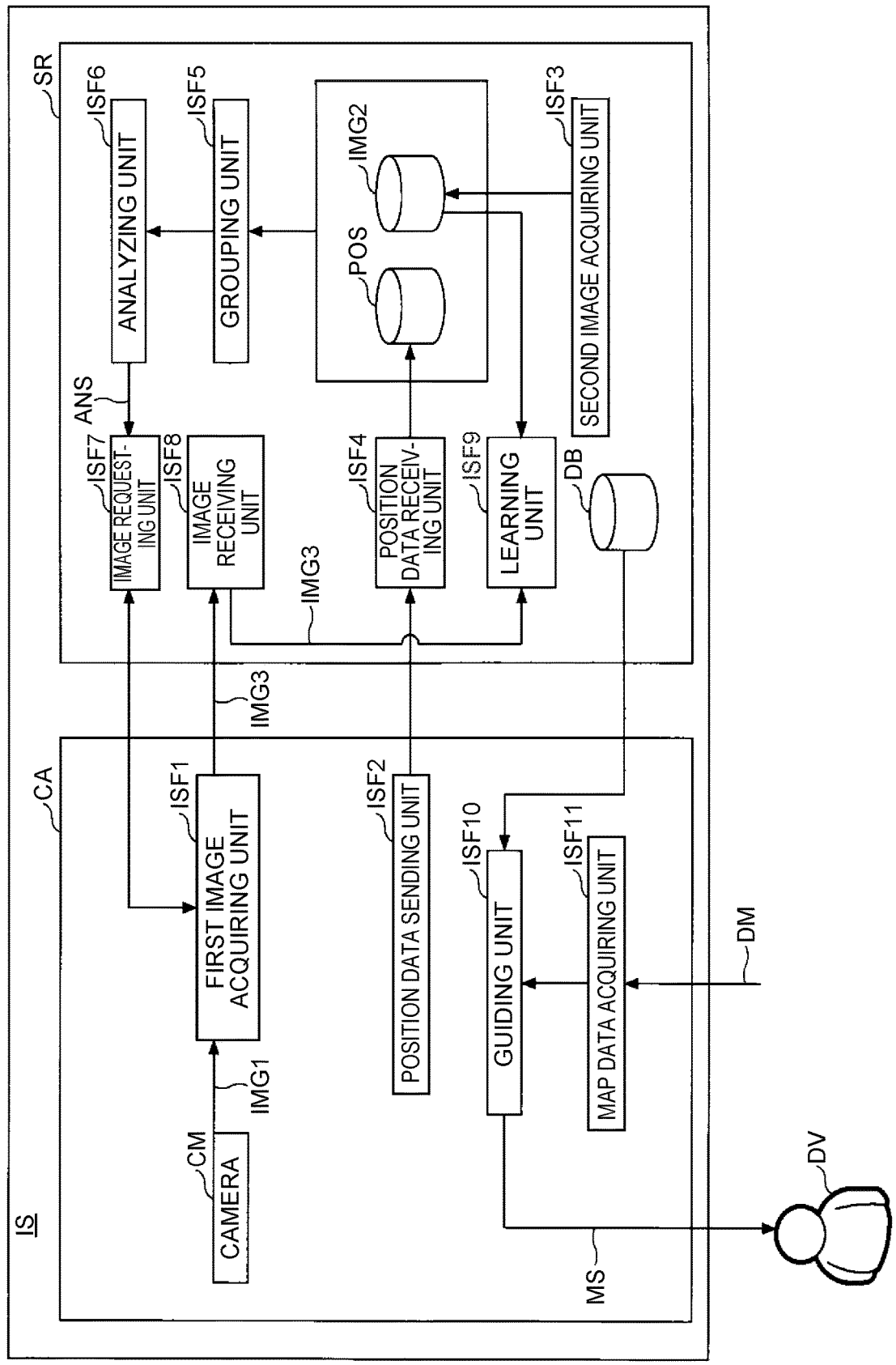
FIG. 11 is a functional block diagram showing an exemplary functional configuration of the image processing system according to the first embodiment of the disclosure.

FIG. 11 is a functional block diagram showing an exemplary functional configuration of the image processing system according to the first embodiment of the disclosure. For example, as illustrated, the image processing system IS includes a first image acquiring unit ISF1, a position data sending unit ISF2, a second image acquiring unit ISF3, a position data receiving unit ISF4, a grouping unit ISF5, and an analyzing unit ISF6. It is preferable that the image processing system IS have a functional configuration of further including an image requesting unit ISF7, an image receiving unit ISF8, a learning unit ISF9, a guiding unit ISF10, and a map data acquiring unit ISF11, as illustrated. In the following, the illustrated functional configuration will be described as an example.

The first image acquiring unit ISF1 performs a first image acquiring step of acquiring the first image such as the image IMG1 that shows the periphery of the vehicle CA, which is picked up by the image pickup device such as the camera CM. For example, the first image acquiring unit ISF1 is realized by the image acquiring device IM (see FIG. 1) or the like.

The position data sending unit ISF2 performs a position data sending step of sending position data POS indicating the position of the vehicle CA, to the server SR. For example, the position data sending unit ISF2 is realized by the communication device CD (see FIG. 1) or the like.

The second image acquiring unit ISF3 performs a second image acquiring step of acquiring the second image such as the image IMG2. For example, the second image acquiring unit ISF3 is realized by the communication device SH5 (see FIG. 1) or the like.

The position data receiving unit ISF4 performs a position data receiving step of acquiring the position data POS from the position data sending unit ISF2. For example, the position data receiving unit ISF4 is realized by the communication device SH5 (see FIG. 1) or the like.

The grouping unit ISF5 performs a grouping step of dividing a plurality of second images into a plurality of groups based on the parameter indicating the condition at the time of image pickup. For example, the grouping unit ISF5 is realized by the CPU SH1 (see FIG. 1) or the like.

The analyzing unit ISF6 performs an analyzing step of analyzing the balance among the plurality of groups that is the balance of the number of the second images that belong to the plurality of groups, and outputting an analysis result ANS. For example, the analyzing unit ISF6 is realized by the CPU SH1 (see FIG. 1) or the like.

The image requesting unit ISF7 performs an image requesting step of requesting, to the vehicle CA, the third image such as the image IMG3 that is selected from the image IMG1 and by which the balance is adjusted, based on the analysis result ANS. For example, the image requesting unit ISF7 is realized by the communication device SH5 (see FIG. 1) or the like.

The image receiving unit ISF8 performs an image receiving step of receiving the image IMG3 from the vehicle CA. For example, the image receiving unit ISF8 is realized by the communication device SH5 (see FIG. 1) or the like.

The learning unit ISF9 performs a learning step of performing the learning based on the image IMG2, the image IMG3 and the like, and generating a learning database DB. For example, the learning unit ISF9 is realized by the CPU SH1 (see FIG. 1) or the like.

The guiding unit ISF10 performs a guiding step of guiding a driver DV along a route on which the vehicle CA travels, based on the map data DM and the learning database DB. For example, the guiding unit ISF10 is realized by the ECU CT (see FIG. 1) or the like.

The map data acquiring unit ISF11 performs a map data acquiring step of acquiring the map data DM indicating the current position of the vehicle CA, the destination and the way from the current position to the destination. For example, the map data acquiring unit ISF11 is realized by the communication device CD (see FIG. 1) or the like.

For example, the functional configuration may be the following functional configuration.

Figure 12:
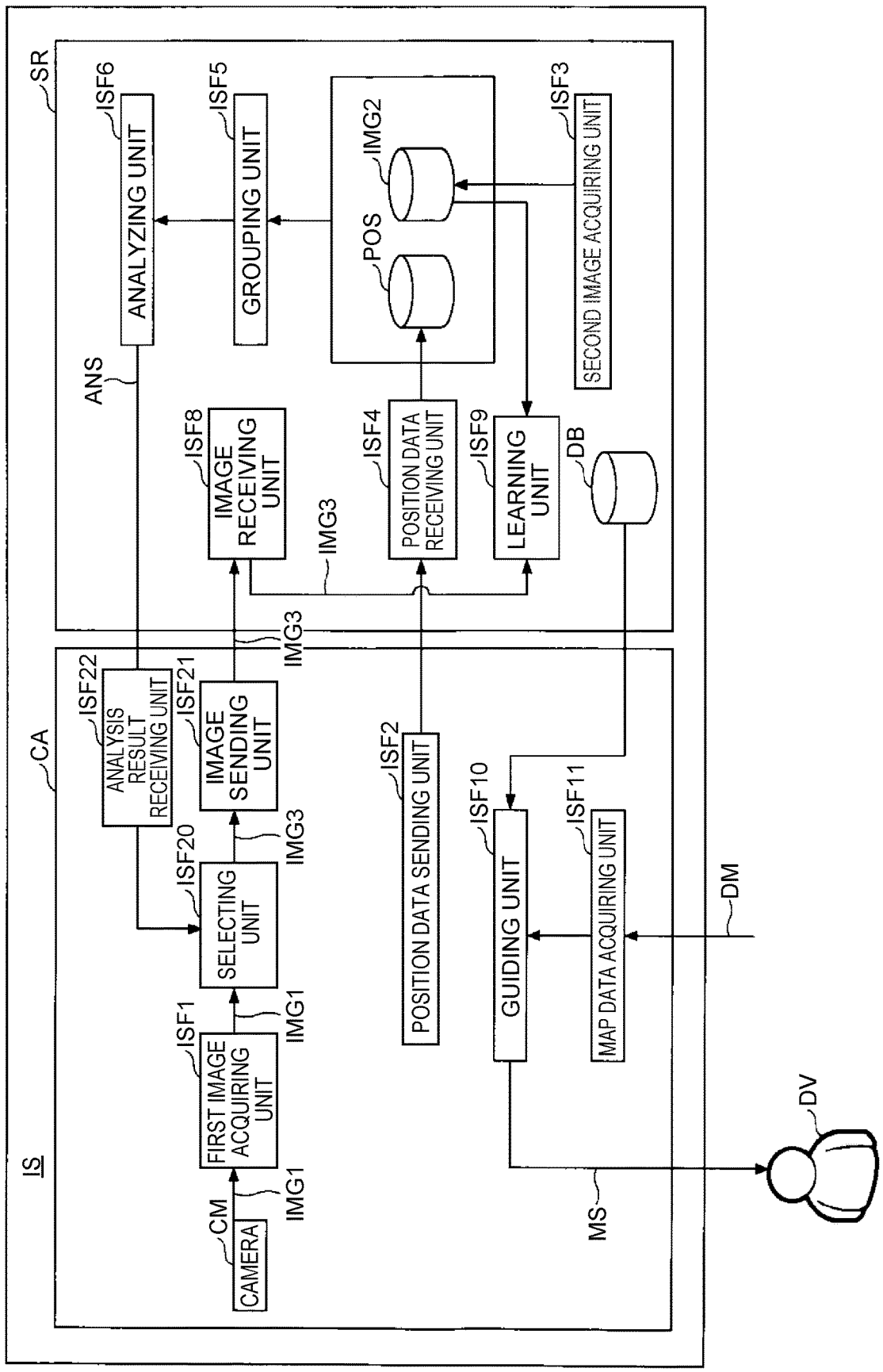
FIG. 12 is a functional block diagram showing an exemplary functional configuration of the image processing system according to the second embodiment of the disclosure.

FIG. 12 is a functional block diagram showing an exemplary functional configuration of the image processing system according to the second embodiment of the disclosure. FIG. 12 is different from FIG. 11 in that the vehicle CA includes a selecting unit ISF20, an image sending unit ISF21 and an analysis result receiving unit ISF22. The different point from FIG. 11 will be mainly described below.

The selecting unit ISF20 performs a selecting step of selecting the image IMG3 from the image IMG1 based on the analysis result ANS. For example, the selecting unit ISF20 is realized by the ECU CT (see FIG. 1) or the like.

The image sending unit ISF21 performs an image sending step of sending the image IMG3 to the server SR. For example, the image sending unit ISF21 is realized by the communication device CD (see FIG. 1) or the like.

The analysis result receiving unit ISF22 performs an analysis result receiving step of receiving the analysis result ANS. For example, the analysis result receiving unit ISF22 is realized by the communication device CD (see FIG. 1) or the like.

In the case of the above configurations, the image processing system IS, first, can acquire the image IMG2 with the second image acquiring unit ISF3. Furthermore, the image processing system IS can determine each parameter of the images IMG2, based on the position data and the like.

The parameter indicates the image pickup condition of each of the images IMG2, or the like. For example, the parameter is the time at which the image IMG2 is picked up, the weather, the vehicle type of a vehicle that picks up the image IMG2, the model of the camera CM, the control information about a vehicle that picks up the image IMG2, the congestion condition around a position at which the image IMG2 is picked up, the crowded condition around a position at which the image IMG2 is picked up, the space condition around a position at which the image IMG2 is picked up, the vehicle speed of a vehicle that picks up the image IMG2, a lane on which a vehicle that picks up the image IMG2 is positioned, or a combination thereof. Further, images having an identical parameter are grouped to an identical group. Accordingly, when the analyzing unit ISF6 can grasp the parameter, the analyzing unit ISF6 can analyze the balance as shown in FIG. 3.

In the machine learning or the like, when there is a bias in the condition of the image, the accuracy of the process using the learning database DB including the result of the machine learning often decreases. For example, using the learning database DB, a process of generating traffic information such as congestion prediction, an image recognition in the car navigation, or the like is performed in the vehicle CA or the like.

The image processing system IS can grasp the balance of images to be used for the machine learning or the like, from the analysis result ANS. Then, the image processing system IS can predict, for example, the accuracy of the process using the learning database DB, based on the balance of images for generating the learning database DB. For example, it is possible to predict whether the hitting ratio or detection ratio for congestion, the recognition ratio for a predetermined object in image recognition, or the like is high, based on whether the balance is good or poor.

When the image processing system IS can grasp the balance, the image processing system IS can request the vehicle CA to send the third image for improving the balance, as shown in FIG. 11, for example. Further, when the image processing system IS can grasp the balance, the image processing system IS can make the vehicle CA send the third image for improving the balance, by sending the analysis result ANS to the vehicle CA.

Accordingly, in the case of the above configurations, for example, the following effects are exerted.

FIG. 13 is a diagram showing an exemplary processing result in an image processing system according to an embodiment of the disclosure. The left side of FIG. 13 is a diagram showing an analysis result ANS that is the same balance as that in FIG. 3. When images IMG3 are sent, images satisfying the "condition 2" and images satisfying the "condition 3" are added. Here, it is preferable that the image processing system IS prohibit images satisfying the "condition 1" from being sent to the information processing device.

As a result, the image processing system IS roughly equalizes the respective image numbers for the conditions, as shown in the right side of FIG. 13, for example, and thereby, can improve the balance.

In supervised machine learning or the like, when there is a bias in data to be used for the learning, that is, in so-called supervised data, so that the balance is poor, the accuracy of a process in a subsequent step often decreases. Meanwhile, the balance of data such as images often decreases when the balance is not adjusted. For example, in the case where images in a congestion condition and images in a non-congestion condition are collected for a process of congestion prediction, images in the non-congestion condition are more likely to be collected because the non-congestion condition is more frequent.

Moreover, in metropolitan areas, major roads and the like, it is easy to collect images because there are many vehicles. In contrast, in countries, general roads and the like, it is harder to collect images than in metropolitan areas, major roads and the like. Accordingly, when position, road or the like is adopted as the condition, the number of images picked up in metropolitan areas, major roads and the like often becomes large so that the balance becomes poor. Further, as for climate, in some cases, the number of "rainy" days becomes large depending on season or the like. In such a case, images picked up in the "rainy" condition are likely to be collected. Moreover, in many cases, images picked up during the morning or the daytime are likely to be collected, and images picked up during the night are unlikely to be collected.

Hence, by adding the third image and improving the balance, the image processing system IS can perform, for example, a machine learning for performing an accurate process. As shown in the right side of FIG. 13, when a sufficient volume of data has been already collected, the collection of the data is prohibited. Thereby, it is possible to avoid needless data from being collected, and therefore, it is possible to decrease communication volume in data sending, and to reduce communication costs or a storage region in which data is saved.

In the configurations shown in FIG. 11 and FIG. 12, the image processing system IS can accurately detect signboards and the like, and therefore, can accurately inform the driver DV about signboards and the like as landmarks in the guide, through a message MS or the like.

Comparative Example

FIG. 14 is a diagram showing a comparative example. For example, as illustrated, for adjusting the balance, a method of deleting data is possible. Specifically, in the case of the same balance as the balance on the left side of FIG. 13, images of the "condition 1" and images of the "condition 2" are deleted such that the number of the images of the "condition 1" and the number of the images of the "condition 2" become equal to the number of the images of the "condition 3". When the balance is adjusted in such a method, the deleted images are wasted.

Other Embodiments

The guiding unit ISF10 and the map data acquiring unit ISF11 may be included in a vehicle other than a vehicle equipped with the image pickup device.

An embodiment according to the disclosure may be realized by a program that makes a computer such as an information processing device or an information processing system execute the steps in the above image processing method. The program may be distributed while being stored in a computer-readable recording medium.

Furthermore, as each device described above, a plurality of devices may be provided. Further, all or some of the steps in the above image processing method may be executed in a parallel, distributed or redundant manner.

Thus, preferable embodiments of the disclosure have been described. However, the disclosure is not limited to the described embodiments, and various modifications or alterations can be made within the scope of the spirit of the disclosure described in the claims.

What is claimed is:

1. An image processing system comprising:
a vehicle; and
an information processing device, wherein
the vehicle includes:
    an image pickup device;
    a first image acquiring unit configured to acquire a first image that shows a periphery of the vehicle, the first image picked up by the image pickup device; and
    a position data sending unit configured to send position data to the information processing device, the position data indicating a position of the vehicle when the first image is picked up, and
the information processing device includes:
    a position data receiving unit configured to receive the position data from the position data sending unit;
    a second image acquiring unit configured to acquire a plurality of second images for machine learning, the plurality of second images being relevant to the position of the vehicle based on the position data;
    a grouping unit configured to divide the plurality of second images into a plurality of groups based on a parameter indicating a condition at time of image pickup;
    an analyzing unit configured to analyze a balance among the plurality of groups, the balance being a balance of the number of the second images that belong to the plurality of groups;
    an image requesting unit configured to request a third image to the vehicle based on an analysis result by the analyzing unit, the third image being an image that is selected from the first image and by which the balance is adjusted;
    an image receiving unit that receives the third image from the vehicle; and
    a learning unit that performs learning based on the second images and the third image, and generates a learning database.

2. An image processing system comprising:
a vehicle; and
an information processing device, wherein
the vehicle includes:
    an image pickup device;
    a first image acquiring unit configured to acquire a first image that shows a periphery of the vehicle, the first image picked up by the image pickup device; and
    a position data sending unit configured to send position data to the information processing device, the position data indicating a position of the vehicle when the first image is picked up, and
the information processing device includes:
    a position data receiving unit configured to receive the position data from the position data sending unit;
    a second image acquiring unit configured to acquire a plurality of second images for machine learning, the plurality of second images being relevant to the position of the vehicle based on the position data;
    a grouping unit configured to divide the plurality of second images into a plurality of groups based on a parameter indicating a condition at time of image pickup; and
    an analyzing unit configured to analyze a balance among the plurality of groups, the balance being a balance of the number of the second images that belong to the plurality of groups, wherein the vehicle further includes:
an analysis result receiving unit configured to receive an analysis result by the analyzing unit;
a selecting unit configured to select a third image from the first image based on the analysis result, the third image being an image by which the balance is adjusted; and
an image sending unit configured to send the third image to the information processing device, and the information processing device further includes:
an image receiving unit configured to receive the third image from the vehicle; and
a learning unit configured to perform learning based on the second images and the third image, and to generate a learning database.

3. The image processing system according to claim 1, wherein
the vehicle further includes:
a map data acquiring unit configured to acquire map data indicating a current position of the vehicle, a destination and a way from the current position to the destination; and
a guiding unit configured to perform a guide of a route on which the vehicle travels, based on the map data and the learning database, and
the guiding unit is configured to perform a guide of an intersection using a landmark.

4. The image processing system according to claim 2, wherein
the vehicle further includes:
a map data acquiring unit configured to acquire map data indicating a current position of the vehicle, a destination and a way from the current position to the destination; and
a guiding unit configured to perform a guide of a route on which the vehicle travels, based on the map data and the learning database, and
the guiding unit is configured to perform a guide of an intersection using a landmark.

5. An image processing system comprising:
a vehicle; and
an information processing device, wherein
the vehicle includes:
an image pickup device;
a first image acquiring unit configured to acquire a first image that shows a periphery of the vehicle, the first image picked up by the image pickup device; and
a position data sending unit configured to send position data to the information processing device, the position data indicating a position of the vehicle when the first image is picked up, and the information processing device includes:
a position data receiving unit configured to receive the position data from the position data sending unit;
a second image acquiring unit configured to acquire a plurality of second images for machine learning, the plurality of second images being relevant to the position of the vehicle based on the position data;
a grouping unit configured to divide the plurality of second images into a plurality of groups based on a parameter indicating a condition at time of image pickup; and
an analyzing unit configured to analyze a balance among the plurality of groups, the balance being a balance of the number of the second images that belong to the plurality of groups, wherein the parameter is a position at which the second image is picked up, a road on which the second image is picked up, a time at which the second image is picked up, a weather, a vehicle type of a vehicle that picks up the second image, a model of the image pickup device, control information about the vehicle that picks up the second image, a congestion condition around the position at which the second image is picked up, a crowded condition around the position at which the second image is picked up, a space condition around the position at which the second image is picked up, a vehicle speed of the vehicle that picks up the second image, a lane on which the vehicle that picks up the second image is positioned, or a combination thereof.

6. The image processing system according to claim 5, wherein
the vehicle further includes:
a map data acquiring unit configured to acquire map data indicating a current position of the vehicle, a destination and a way from the current position to the destination; and
a guiding unit configured to perform a guide of a route on which the vehicle travels, based on the map data and the learning database, and
the guiding unit is configured to perform a guide of an intersection using a landmark.

* * * * *